United States Patent [19]

Mott et al.

[11] Patent Number: 4,470,148

[45] Date of Patent: Sep. 4, 1984

[54] SATELLITE-RECEIVER TIME DIVISION MULTIPLE-ACCESS BURST DURATION AND GUARD SPACE MONITOR

[75] Inventors: Richard C. Mott, Gaithersburg; Robert T. Kroll, Jr., Middletown; Tsvi F. Assal, Bethesda, all of Md.

[73] Assignee: Communications Satellite Corporation, Washington, D.C.

[21] Appl. No.: 316,716

[22] Filed: Oct. 30, 1981

[51] Int. Cl.³ ............................................. H04L 7/00
[52] U.S. Cl. .................................... 375/113; 375/114; 370/106
[58] Field of Search .................. 375/94, 95, 106, 113, 375/114, 118; 370/100, 104, 106, 93; 371/42, 47; 328/63, 72

[56] References Cited

U.S. PATENT DOCUMENTS

| | | | |
|---|---|---|---|
| 3,925,732 | 12/1975 | Tanaka | 375/9 X |
| 4,052,670 | 10/1977 | Watanabe et al. | 375/118 |
| 4,242,755 | 12/1980 | Gauzan | 375/9 X |
| 4,356,566 | 10/1982 | Wada et al. | 375/113 |

Primary Examiner—Robert L. Griffin
Assistant Examiner—Stephen Chin
Attorney, Agent, or Firm—Sughrue, Mion, Zinn, Macpeak & Seas

[57] ABSTRACT

A burst duration and guard space monitor circuit which produces burst duration and guards space signals which are substantially unaffected by nulls or near nulls in a received QPSK signal. The received QPSK signal is compared with a fixed threshold voltage. The comparison output is sampled at twice the symbol rate of the QPSK signal and the samples are first clocked into a three-bit burst duration shift register. The outputs of each of the cells of the burst duration shift register are OR'ed to produce the burst duration signal. The burst duration signal is inverted and then clocked into a four-bit guard space shift register, the outputs of which are OR'ed to produce the guard space signal. A clock signal is produced for operating the flip-flops, burst duration shift register and guard space shift register which has a frequency of twice the clock frequency of the QPSK signal. This clock signal is adjusted in phase so that the sampling times of the detected QPSK signal occur at times removed from nulls or near nulls therein.

7 Claims, 6 Drawing Figures

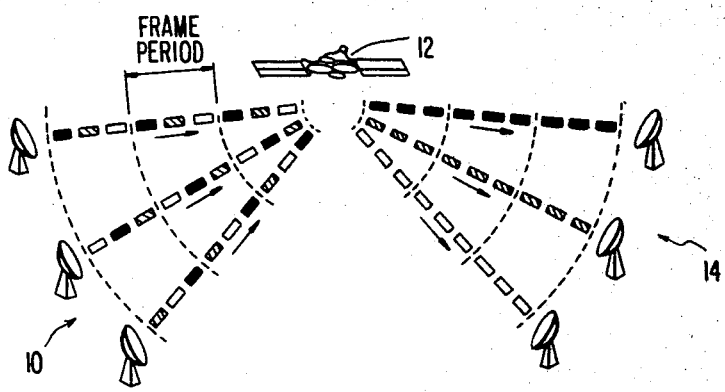
FIG.1
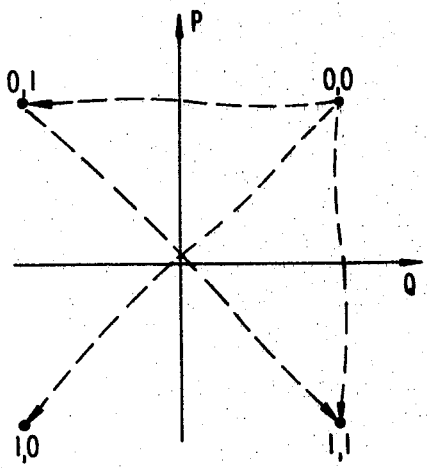
FIG.2
FIG.3
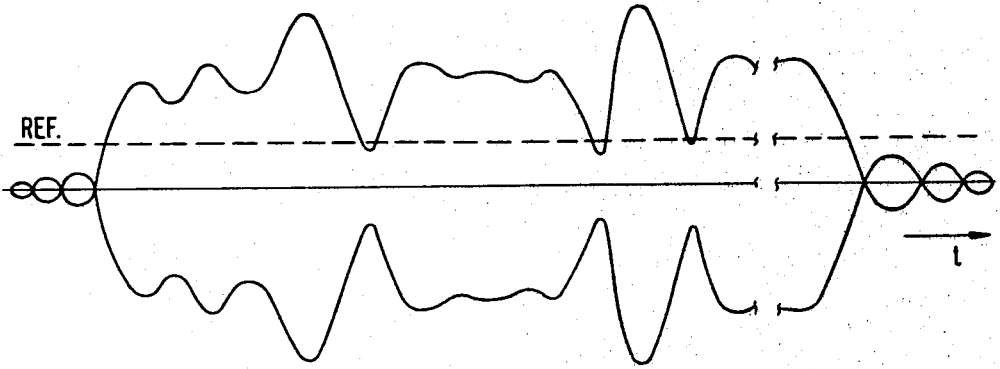

SATELLITE-RECEIVER TIME DIVISION MULTIPLE-ACCESS BURST DURATION AND GUARD SPACE MONITOR

BACKGROUND OF THE INVENTION

The invention relates generally to a satellite-switched time-division multiple access (SS-TDMA) system. More specifically, the invention relates to a circuit for establishing and detecting the duration of received bursts and the guard space therebetween in a satellite-switched time-division multiple access system.

A typical satellite-switched time-division multiple access system is shown schematically in the view of FIG. 1. The system includes plural transmitting earth terminals 10 and plural receiving earth terminals 14 and a relay satellite 12 for receiving, switching and subsequently retransmitting the information burst signals received from the transmitting earth terminals 10. In such a system, each of the transmitting earth terminals 10 can communicate through the satellite 12 with a specific one of the receiving earth terminals 14. In FIG. 1, the data bursts transmitted by the various transmitting earth terminals 10 and retransmitted by the satellite 12 are identified by one of a solid rectangle, a hatched rectangle and an open rectangle to identify the receiving terminal for which the bursts are intended. Data is transmitted from each transmitting earth terminal in a series of frames each of which can contain bursts of data intended for any one of the receiving earth terminals 14.

The satellite 12 must identify to which of the receiving earth terminals 14 a particular burst of received data is intended and then route the burst of data through a switching circuit to on-board transmitting facilities which direct the burst of data onto an appropriate beam to the intended receiving earth terminal 14.

A predetermined minimum amount of time, termed a "guard space" or "guard time" is required between bursts to prevent interference between earth terminals and to permit the satellite to perform the necessary switching operations for properly routing the data bursts. If the guard time is too short, due to differences in propagation delays and other factors, two separate data bursts may overlap one another at a receiving earth terminal 14 and thus interfere with one another causing a loss of transmitted information. It is thus necessary to monitor the amount of guard time which is being provided by the transmitting earth terminals 10 and by the satellite 12 in order to ensure that the system is operating properly and that there will be no interference between data bursts retransmitted by the satellite 12.

In performing the monitoring function, it is also desirable to provide a signal which indicates the presence of received data bursts. Such a signal is useful in determining whether or not the data bursts are of the correct length and for activating and synchronizing the digital processing circuitry which receives the data bursts. It is obviously desirable that a guard space signal and a burst duration signal which are produced indicative of the guard space and burst times, respectively, be aligned as closely as possible with the appropriate time periods in the received signal envelope to minimize the measuring error and to maintain a minimum guard space.

Prior art proposals for generating burst duration and guard space signals did not produce entirely satisfactory and accurate results. The primary reason for this failure relates to the type of modulation employed and problems inherent therewith. Specifically, in nearly all satellite communication systems, the well-known QPSK (Quaternary Phase Shift Keying) modulation technique has been employed. According to this technique, an incoming bit stream is divided into two channels which are then used to modulate in-phase and out-phase carriers which are subsequently recombined prior to transmission. With this technique, each symbol period bears information relating to two bits of the input data stream.

FIG. 2 is a diagram which illustrates transitions between the four possible states of the transmitted signal produced according to the QPSK technique. In this diagram, P and Q denote, respectively, the two digital channels into which the incoming bit stream is divided. There are four possible phase states of the modulated carrier corresponding to input data stream bit combinations of 0,0; 0,1; 1,0 and 1,1. For instance, for transitions between 0,0 and 0,1 and between 0,0 and 1,1 the path traversed during the transition does not pass near or through the origin and hence the amplitude of the transmitted signal does not pass through or near 0. On the other hand, for a transition between 0,0 and 1,1 or between 0,1 and 1,1 ideally, the path is through the origin. Because of various nonlinearities and non-ideal components, the path may not pass precisely through the origin. Nevertheless, the path during the transition passes near the original so that the amplitude of the output transmitted signal undergoes a sharp dip or near null during certain phase transition times.

This is illustrated further by the diagram of FIG. 3 which shows a typical transmitted waveform for a particular TDMA burst containing a number of near nulls due to 180 degrees phase transitions passing near the origin as described above.

In prior approaches to the generation of the burst duration and guard space signals, the received signal was envelope-detected and the amplitude of the extracted envelope signal compared with a fixed reference value. The results of the comparison were taken as the burst duration signal and the inverse of the burst duration signal thus produced as the guard space signal. Unfortunately, this technique was not successful because the near nulls produced a false burst duration signal due to the magnitude of the extracted envelope falling below the fixed reference value.

This technique could not easily be improved upon. For instance, if the extracted envelope of the bursts were subjected to low-pass filtering in order to smooth out the near nulls so that the signal did not contain portions which fell below the reference value, the accuracy of the burst duration signal and guard space signal with respect to the actual timing of the burst was lowered. Similarly, filtering the comparison signal would also produce inaccuracies in the alignment of the burst duration signal and guard space signal with the actual timing of the received burst. Moreover, it was not practical with such a technique to lower the reference value significantly because of the possibility of producing false burst duration and guard space signals due to the presence of noise. Yet further, the presence of a large number of near nulls in close succession would nearly always produce a false burst duration signal.

SUMMARY OF THE INVENTION

Accordingly, it is an object of the present invention to provide a circuit for producing a burst duration signal and a guard space signal accurately indicative of the presence of a received burst and a guard space between received bursts, respectively.

It is a further object of the invention to provide such a circuit for producing a burst duration signal and guard space signal wherein false signals are not produced by the presence of nulls or near nulls, no matter how many of these are present in close succession or how deep they may be.

These, as well as other objects of the invention, are met by a circuit for producing a burst duration signal and a guard space signal in which a received signal is compared with a relatively low threshold voltage and then sampled at a rate of at least twice the symbol rate of the information contained in the received signal. A predetermined number of adjacent samples are stored in a burst duration shift register. If at least one of the stored samples is in the proper logic state, a burst duration signal is outputted.

To generate the guard space signal, the outputs of the various positions of the burst duration shift register are examined. If and only if all of the bit positions of the burst duration shift register are in a state indicative of the absence of a burst is a logical 1 inputted to a guard space shift register. The examination process is carried out for each symbol time of the received signal. The guard space signal is outputted only when the guard space shift register is filled with logical 1's.

To produce the sampling clock, the received clock is doubled in frequency and then adjusted in phase so that the appropriate clock edges align with the detected envelope signal at positions removed from nulls or near nulls. The phasing adjustment of the clock need be performed only once, during initial system set up. Sampling at twice the symbol rate reduces the measurement uncertainty to less than half of one symbol period.

BRIEF DESCRIPTION OF THE DRAWINGS

FIG. 1 is a schematic view showing a satellite-switched time-division multiple access system to which the invention is applied;

FIG. 2 is a phase transition diagram for QPSK modulation;

FIG. 3 is a waveform diagram of a typical received TDMA burst;

DESCRIPTION OF THE PREFERRED EMBODIMENTS

Figure 4:
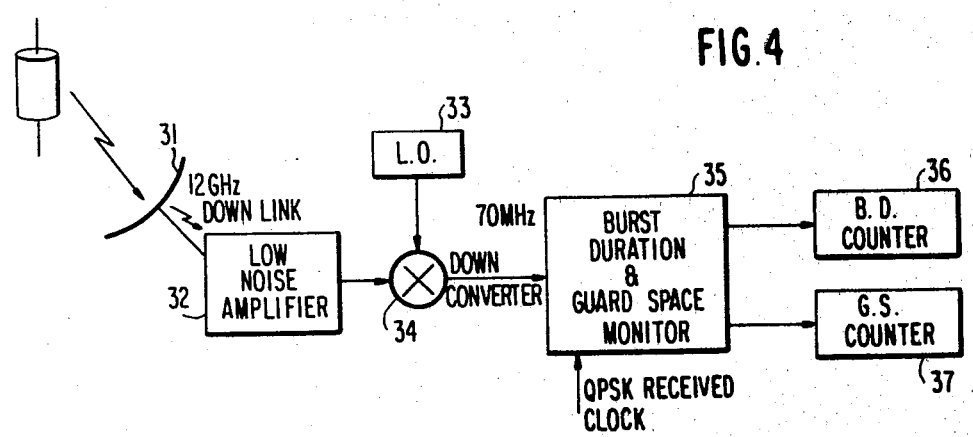
FIG. 4 is a block diagram of a portion of a receiving earth terminal showing the connection of a burst duration and guard space monitor circuit of the invention.

Referring first to FIG. 4, there is shown therein a block diagram of a portion of a receiving earth terminal including a burst duration and guard space monitor circuit 35 which is constructed in accordance with the teachings of the present invention. In the receiving earth terminal 14, a signal received by an antenna 31 will typically have a frequency of 12 GHz. The received signal is boosted in level by a low noise amplifier 32 before being coupled to one input of a mixer 34. A local oscillator signal produced by an oscillator 33 is mixed with the 12 GHz received signal by the mixer 34 to produce a 70 MHz IF signal which is coupled to the primary signal input of the burst duration and guard space monitor circuit 35.

The burst duration and guard space monitor circuit 35 also receives a block signal which is produced from the received QPSK signal. This clock signal is generated in a conventional fashion. The BURST DURATION signal outputted by the burst duration and guard space monitor 35 is coupled to the input of a burst duration counter 35 while, similarly, the GUARD SPACE signal outputted by the burst duration and guard space monitor circuit 35 is coupled to the input of a guard space counter 37. The burst duration counter 36 and the guard space counter 37 do not form a part of the present invention and will not be discussed in detail herein.

Figure 5:
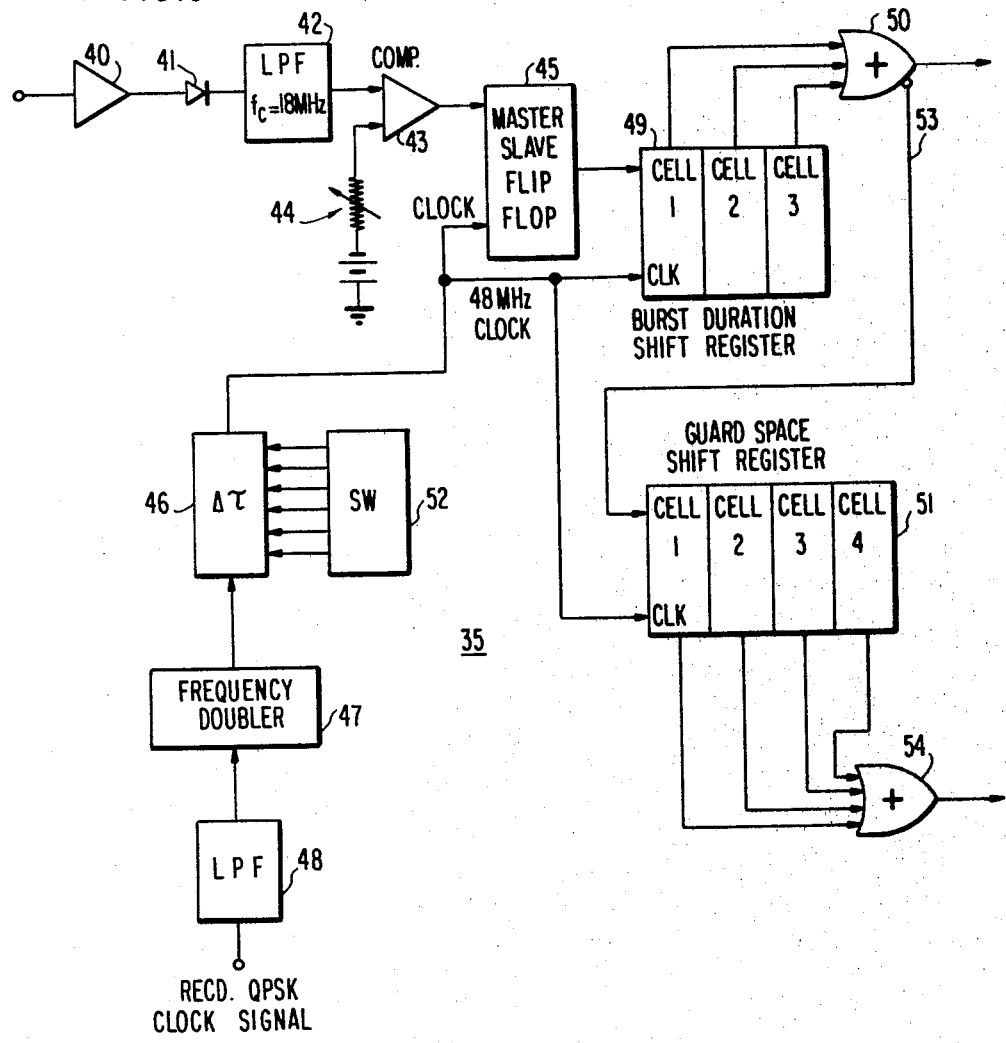
FIG. 5 is a block schematic diagram of a burst duration and guard space monitor circuit of the invention.

A detailed schematic diagram of the burst duration and guard space monitor circuit 35 is shown in the view of FIG. 5. The 70 MHz IF signal is boosted by an amplifier 40 prior to being coupled to a detector diode 41. The detector diode 41 is preferably a Schottky barrier detector diode. The output from the detector diode 41 follows the envelope of the received burst signal. This signal is filtered by a low-pass filter 42. Typically, the lowpass filter 42 will have cut-off frequency of 18 MHz.

The envelope signal outputted by the low-pass filter 42 is coupled to one comparison input of a comparator 43 while the other comparison input of the comparator 43 receives a fixed voltage from a threshold setting circuit 44. The magnitude of the voltage outputted by the threshold circuit 44 is determined by the setting of a potentiometer therein in a well-known manner. The output of the comparator 43 is fed to the data input of a master-slave flip-flop 45, which is preferably a high-speed edge-triggered device.

A burst duration shift register, which is three bits in length in the embodiment illustrated, receives the output of the master-slave flip-flop 45 at its data input. The clock input of the burst duration shift register 49 is the same as that for the master-slave flip-flop 45 and will be discussed in further detail below. The three outputs from the three cells of the burst duration shift register 49 are coupled to corresponding inputs of an OR gate 50. The OR gate 50 has both inverted and non-inverted outputs. The BURST DURATION signal is generated at the non-inverted output of the OR gate 50.

The inverted output of the OR gate 50 is fed to the data input of a guard space shift register 51. The length of the guard space shift register 51 is one bit (one cell) greater than that of the burst duration shift register 49. The guard space shift register 51 receives the same clock as the master-slave flip-flop 45 and the burst duration shift register 49. The outputs of the four cells of the guard space shift register 51 are OR'ed together by an OR gate 54. The GUARD SPACE signal is produced at the output of the OR gate 54.

To generate the clock signal used to operate the master-slave flip-flop 45, the burst duration shift register 49 and the guard space shift register 51, a received QPSK clock signal is first passed through a low-pass filter 48 and then to a frequency doubler 47. Typically, the frequency of QPSK clock signal will be 24 MHz, and hence the frequency of the output of the frequency doubler 47 will be 48 MHz. The waveform of the output of the frequency doubler 47 is preferably a square wave.

The output of the frequency doubler 47 is passed through a variable delay circuit 46 before being coupled to the clock inputs of the master-slave flip-flop 45, the burst duration shift register 49 and the guard space shift register 51. The amount of delay imparted by the delay circuit 46 is set by programming switches 52. This amount of delay is set in a manner which will be described with reference to waveforms shown in FIG. 6.

Figure 6:
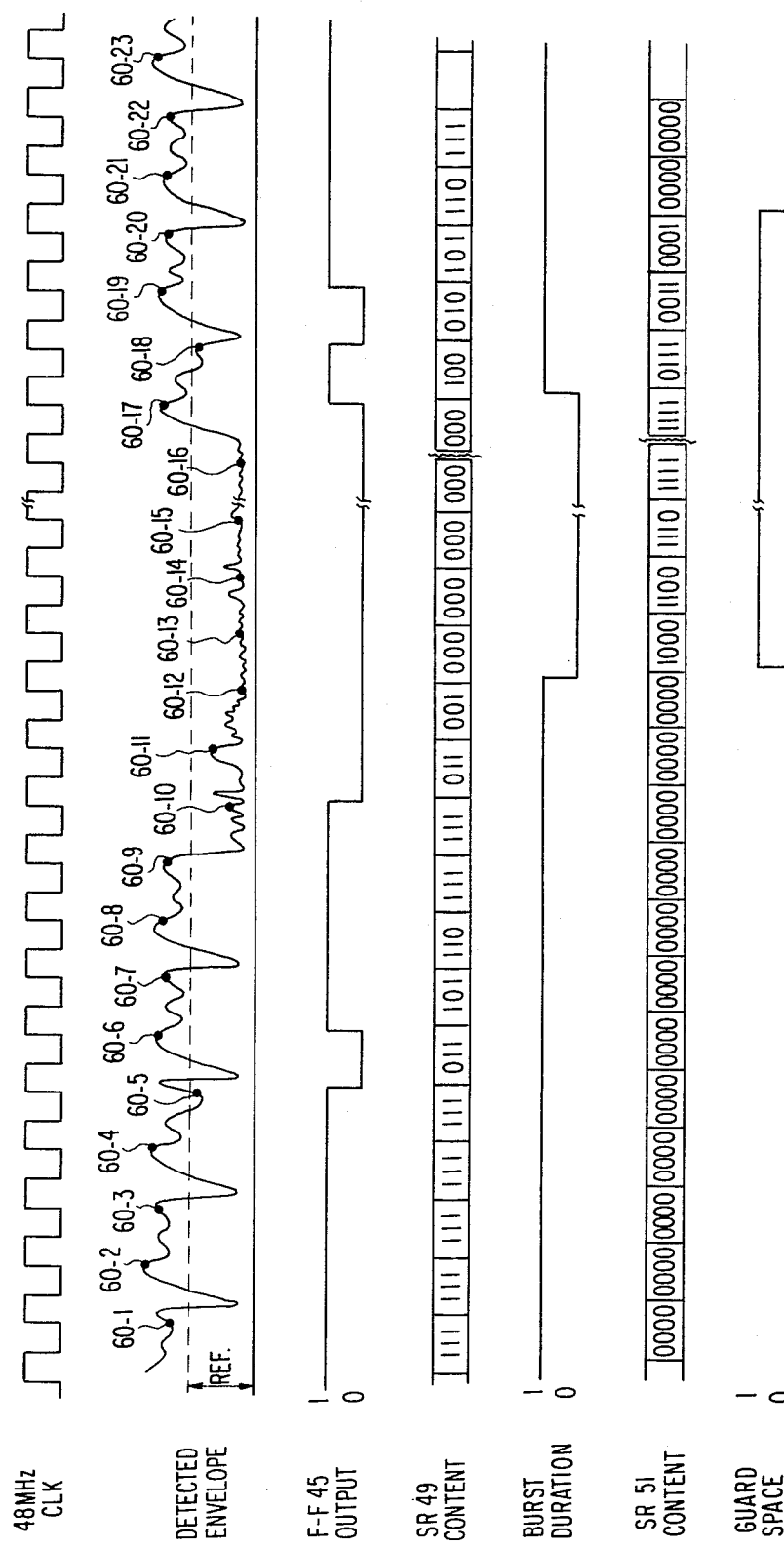
FIG. 6 is a waveform and timing diagram used to illustrate the operation of the circuit of FIG. 5.

Referring now to FIG. 6, a worst-case detected envelope signal is shown. This signal has a near null between each two adjacent symbols and is of a form which could not be successfully handled by prior art techniques. In the circuit of FIG. 5, it will be assumed that the master-slave flip-flop 45 is triggered on the rising edge of the 48 MHz clock signal, although the falling edge could be used as well without loss of generality.

In accordance with the invention, the rising edges of the 48 MHz clock signal are aligned with the detected envelope at positions removed from the near nulls therein. FIG. 6 illustrates correct alignment between the 48 MHz clock signal and the detected envelope signal wherein dots on the detected envelope signal illustrated in FIG. 6 indicate the sampling times thereof. To achieve this correct alignment, the detected envelope signal and the 48 MHz clock signal are displayed simultaneously on an oscilloscope. Then, the programmable switches 52 are adjusted so as to set the rising edges of the 48 MHz clock at positions on the detected envelope signal removed from the nulls therein. Preferably for this operation, a received signal is simulated having a near null between each adjacent symbol, that is, each data transition in the signal on a P-Q plot as shown in FIG. 2 passes through or near the origin thereof.

Correct alignment between the 48 MHz clock and the detected envelope signal is shown in FIG. 6. The dots 60-1 through 60-23 indicate the sampling times on the detected envelope waveform which correspond to the rising edges of the 48 MHz clock signal outputted from the time delay circuit 46. As can be seen in this diagram, each of the dots or timing intervals 60-1 through 60-23 falls on the waveform of the detected envelope at a position away from the near nulls therein.

The operation of the circuitry of FIG. 5 will be described with further reference to the timing diagram of FIG. 6. Here, it is assumed that initially the contents of the burst duration shift register 49 are all 1's. It may be seen that here the amplitude of the detected envelope signal is above the reference level (indicated by a dashed line) for sampling time 60-1 through 60-4. At sampling time 60-5, due to noise, a circuit non-linearity or the like, the amplitude of the detected envelope signal falls below the reference level. This causes a logical 0 to be outputted by the master-slave flip-flop 45. This in turn causes the content of the burst duration shift register 49 to change from 111 to 011 after the 0 on the output of the master-slave flip-flop 45 goes to 0. However, the BURST DURATION signal generated on the non-inverted output of the OR gate 50 remains at the logical 1 level because the remaining two cells of the burst duration shift register still contain 1's.

At the succeeding sampling time 60-6, the amplitude of the detected envelope is again above the reference level, whereupon the output of the master-slave flip-flop 45 returns to the 1 state. The 0 from the first cell of the burst duration shift register 49 is succeedingly clocked to the second and then the third cell as logical 1's are clocked into the first cell for successive burst times 60-7 through 60-9. Because there is always at least one logical 1 present in the output of the burst duration shift register 49 during this time, the non-inverted output from the OR gate 50 is always in the logical 1 state.

During the time from prior to sampling time 60-1 through sampling time 60-9, the burst duration signal has continuously been in the logical 1 state. Hence, the inverted output from the OR gate 50 is at 0 and all 0's are accordingly clocked into the guard space shift register 51. Because the output from each cell of the guard space shift register 51 are logical 0's, the GUARD SPACE signal outputted by the OR gate 50 remains in the 0 state throughout this period.

An actual guard space time is interposed between sampling time 60-9 and 60-17. Starting with sampling time 60-10 and proceeding through sampling time 60-16, logical 0's are clocked in sequence from the output of the master-slave flip-flop 45 into the cells of the burst duration shift register 49. After the third sampling time for which the amplitude of the detected envelope signal falls below the reference level and for which logical 0's are clocked from the master-slave flip-flop 45 into the burst duration shift register 49, the burst duration shift register 49 becomes filled with all 0's. At that time, the burst duration signal generated on the non-inverted output of the OR gate 50 falls to the 0 state. Simultaneously, the inverted output of the OR gate 50 changes to the 1 state. So long as the burst duration signal remains in the 0 state and, accordingly, the inverted output of the OR gate 50 is in the 1 state, 1's are clocked into the guard space shift register 51. When the first 1 is clocked into the guard space shift register 51, the GUARD SPACE signal generated on the output of the OR gate 54 changes from the 0 to the 1 state.

A new burst starts at sampling time 60-17. For sampling time 60-17, the detected envelope signal is above the reference level and hence a logical 1 is outputted by the flip-flop 45 and a 1 is clocked into the first cell of the shift register 49. Accordingly, the burst duration signal changes from the 0 to the 1 state. For the second sampling time of the detected envelope signal of the new burst, it is assumed that the amplitude thereof drops below the reference level and hence a 0 is outputted by the flip-flop 45. However, due to the presence of the 1 in the second cell which was transferred to the second cell subsequent to the sampling time 60-18, the burst duration signal remains in the 1 state. It is then assumed, as shown in FIG. 3, that the detected envelope signal remains above the reference level for the remaining sampling times shown. Accordingly, logical 1's are clocked into the burst duration shift register 49.

As soon as the BURST DURATION signal returns to the 1 state, the inverted output of the OR gate 50 changes back to 0 and 0's are clocked into the guard space shift register 51. When the guard space shift register 51 has been filled with 0's, the GUARD SPACE signal returns to the 0 state.

Thus it can be appreciated from FIG. 6 that there is no dropping of the burst duration signal due to the detected envelope falling below the reference level due to a noise impulse or the like. It can also be appreciated that there would be no dropping of the GUARD SPACE signal due to a noise impulse of amplitude greater than the reference level occurring during the guard space time interval. Also, the burst duration signal is completely unaffected by the near nulls in the detected envelope signal. Still further, the burst duration signal and the guard space signal are outputted in the appropriate states with very little delay with respect to the detected envelope signal. Hence, the invention provides for the generation of a burst duration signal and a guard space signal; with highly accurate timing, with noise immunity, and without error.

What is claimed is:

1. A burst duration and guard space signal generator circuit for use in TDMA telecommunications systems comprising:
   means for sampling a received detected QPSK envelope signal at a rate greater than a symbol rate of said envelope signal;
   burst duration signal producing means operating in response to a first predetermined number of successive samples of said detected envelope signal for outputting said burst duration signal in an active state when at least one of said first predetermined number of samples of said detected envelope signals are in a first logic state;
   guard space signal producing means operating in response to said burst duration signal producing means for outputting said guard space signal in an active state if and only if said burst duration signal has been in an inactive state for a predetermined second number of samples;
   and wherein said burst duration signal generating means comprises first shift register means having at least two bit outputs and receiving an output from said sampling means and a first OR gate having inputs coupled to each of said bit outputs of said first shift register means, said burst duration signal being generated at an output of said first OR gate.

2. The burst duration and guard space signal generating circuit of claim 1 wherein said guard space signal generating means comprises second shift register means receiving an inverted output from said first OR gate; and a second OR gate having inputs coupled to each bit output of said second shift register, said guard space signal being generated on an output of said second OR gate.

3. The burst duration and guard space signal generating circuit of claim 2 wherein said sampling means comprises means for generating a clock signal at twice said symbol rate of said envelope signal and means for adjusting a phase of said clock signal relative to a phase of said envelope signal.

4. The burst duration and guard space monitor circuit of claim 3 wherein said sampling means comprises a flip-flop receiving said clock signal, said clock signal also being coupled to clock inputs of said first and second shift registers.

5. The burst duration and guard space signal generating circuit of any of claims 1, 2, 3 or 4 wherein said first number is three and said second number is four.

6. A burst duration and guard space signal generating circuit comprising: detector means receiving a QPSK modulated signal; a first low-pass filter having an input coupled to an output of said detector means; a comparator having a first comparison input coupled to an output of said first low-pass filter and a second input coupled to a variable source of a threshold voltage; a master slave flip-flop having a data input coupled to an output of said comparator; a three-bit first shift register having a data input coupled to an output of said master-slave flip-flop; a first OR gate having inputs coupled to each bit output of said first shift register, said burst duration signal being produced on an output of said first OR gate; a four-bit second shift register receiving an inverted output from said first OR gate; a second OR gate having inputs coupled to each bit output of said second shift register, said guard space signal being produced on an output of said second OR gate; a second low-pass filter receiving a clock signal having a frequency corresponding to a symbol rate of said QPSK signal; a frequency doubler having an input coupled to an output of said second low-pass filter; an adjustable delay circuit having a signal input coupled to an output of said frequency doubler and a signal output coupled to clock inputs of said flip-flop and said first and second shift registers; and programmable switch means coupled to delay time control inputs of said adjustable delay circuit.

7. The burst duration and guard space generating circuit of any of claims 1, 2, 3 or 4 wherein said sampling means samples said detected envelope signal at a rate twice the symbol rate of said detected envelope signal.

* * * * *

UNITED STATES PATENT AND TRADEMARK OFFICE
CERTIFICATE OF CORRECTION

PATENT NO. : 4,470,148

DATED : September 4, 1984

INVENTOR(S) : Mott et al.

It is certified that error appears in the above-identified patent and that said Letters Patent is hereby corrected as shown below:

Column 2, line 23, after "1,1" insert a --,--.

Column 4, line 4, change "block" to --clock--.

Signed and Sealed this

Third Day of September 1985

[SEAL]

Attest:

DONALD J. QUIGG

Attesting Officer    Acting Commissioner of Patents and Trademarks - Designate